(12) United States Patent
Horvath et al.

(10) Patent No.: US 6,785,367 B2
(45) Date of Patent: Aug. 31, 2004

(54) METHOD AND APPARATUS FOR EXTRACTING VOICED TELEPHONE NUMBERS AND EMAIL ADDRESSES FROM VOICE MAIL MESSAGES

(75) Inventors: Steve Horvath, Nepean (CA); Tonis Kasvand, Nepean (CA)

(73) Assignee: Mitel Knowledge Corporation (CA)

(*) Notice: Subject to any disclaimer, the term of this patent is extended or adjusted under 35 U.S.C. 154(b) by 250 days.

(21) Appl. No.: 10/101,083

(22) Filed: Mar. 18, 2002

(65) Prior Publication Data

US 2002/0196910 A1 Dec. 26, 2002

(51) Int. Cl.[7] .............................................. H04M 1/64
(52) U.S. Cl. ............................. 379/88.04; 379/88.08; 704/270
(58) Field of Search .......................... 379/67.1, 88.01, 379/88.02, 88.03, 88.04, 88.08, 88.19, 88.22; 704/270, 275, 276

(56) References Cited

U.S. PATENT DOCUMENTS

| | | | |
|---|---|---|---|
| 4,797,929 A | | 1/1989 | Gerson et al. |
| 5,504,805 A | * | 4/1996 | Lee .......................... 379/88.03 |
| 6,035,017 A | * | 3/2000 | Fenton et al. ............. 379/88.04 |
| 6,073,103 A | | 6/2000 | Dunn et al. |
| 6,192,111 B1 | * | 2/2001 | Wu ........................... 379/88.13 |
| 6,219,407 B1 | | 4/2001 | Kanevsky et al. |
| 6,249,765 B1 | * | 6/2001 | Adler et al. ................. 704/500 |
| 6,567,506 B1 | * | 5/2003 | Kermani ................... 379/88.01 |

FOREIGN PATENT DOCUMENTS

| | | |
|---|---|---|
| EP | 0619668 | 10/1994 |
| EP | 0903919 | 3/1999 |
| EP | 1056265 | 11/2000 |
| EP | 1058446 | 12/2000 |
| EP | 1109390 | 6/2001 |
| EP | 1113631 | 7/2001 |
| GB | 2334404 | 8/1999 |

* cited by examiner

*Primary Examiner*—Scott L. Weaver
(74) *Attorney, Agent, or Firm*—Jones Day

(57) ABSTRACT

The present invention relates to a system for automatically identifying enunciation of telephone numbers and email addresses in voice mail messages for presentation to a user via either voice or text, without the user being required to replay the message. Furthermore, according to the invention the extracted telephone number or email addresses may be forwarded to an application for further processing (e.g. to dial the extracted number, add the email address and/or telephone number to a contacts database, etc.) The user may specify text strings to be searched (other than telephone numbers and email addresses). Thus, a user can specify certain words such as "extension", "email", etc., in order to qualify the extracted number or email address information, or words such as "urgently" or "immediately" to identify important voice mail messages.

10 Claims, 3 Drawing Sheets

METHOD AND APPARATUS FOR EXTRACTING VOICED TELEPHONE NUMBERS AND EMAIL ADDRESSES FROM VOICE MAIL MESSAGES

FIELD OF THE INVENTION

The present invention relates in general to voice mail systems and more specifically to a method and apparatus for identifying and extracting voiced telephone numbers and email addresses from recorded voice mail messages.

BACKGROUND OF THE INVENTION

A common complaint among users of voice mail systems relates to difficulties in extracting and transcribing important information from voice mail messages for later use. As an example, it is common for a caller whose call is answered by voice mail to leave a voice mail message that includes a telephone number or email address at which the caller may be contacted. Unless the caller enunciates the telephone number or email address very slowly, the voice mail recipient may be forced to replay all or a portion of the voice mail message in order to transcribe the telephone number or email address for later use. Most callers find very slow enunciation to be awkward and unnatural, with the result that the majority of such voice mail messages must be replayed once or even several times in order for the voice mail recipient to transcribe the information. Furthermore, the process for replaying voice mail messages is often complex (e.g. requiring memorization of keys on a telephone keypad which have been assigned for the replay function). The process can also be tedious (e.g. some systems require that the entire message be replayed in order to extract only the portion relating to the telephone number or email address).

SUMMARY OF THE INVENTION

According to the present invention, a system is provided for automatically identifying enunciation of telephone numbers and email addresses in voice mail messages for presentation to a user via either a voice or text, without the user being required to replay the message. Furthermore, according to the invention the extracted telephone number or email addresses may be forwarded to an application for further processing (e.g. to dial the extracted number, add the email address and/or telephone number to a contacts database, etc.)

According to another aspect of the invention, a user may specify text strings to be searched (other than telephone numbers and email addresses). Thus, a user can specify certain words such as "extension", "email", etc., in order to qualify the extracted number or email address information, or words such as "urgently" or "immediately" to identify important voice mail messages.

BRIEF DESCRIPTION OF THE DETAILED DRAWINGS

A description of a preferred embodiment of the present invention is provided herein below with reference to the accompanying drawings in which.

DETAILED DESCRIPTION OF PREFERRED EMBODIMENTS

Figure 1:
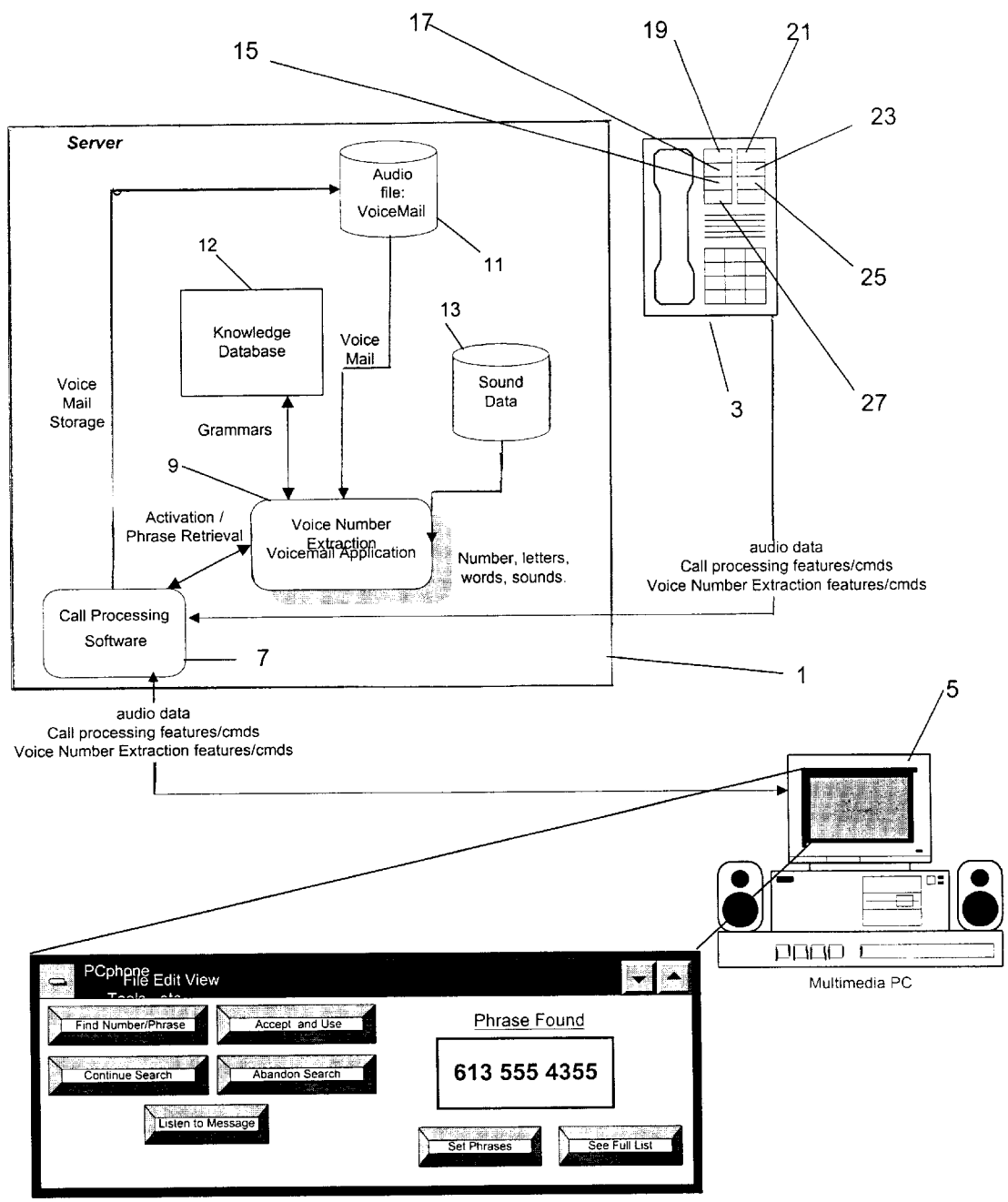
FIG. 1 is a schematic representation of a PBX voice mail system incorporating telephone number extraction in accordance with a preferred embodiment of the present invention.

With reference to FIG. 1, a server based PBX is shown (i.e. PBX) comprising a server 1, to which a plurality of communication endpoints are connected such as telephone 3 and PC 5. The telephone 3 can be a digital set, POTS set, a PC phone or LAN/IP phone. For ease of illustration and description, only two endpoints are depicted in FIG. 1. In practice, a multiplicity of endpoint devices is provided. The server 1 establishes communication between the endpoints under control of call processing software 7, in a well-known manner.

According to the invention, a voice number extraction voicemail application 9 uses an audio file 11, knowledge database 12, and sound database 13, the operations of which are set forth in greater detail below. The telephone 3 includes a plurality of feature keys for executing commands in connection with the voice number extraction application 9. Specifically, a "Listen to Message" key 15 is provided which, when pressed by a telephone user causes DTMF digits (or other signaling) to be sent by the telephone 3 to the call processing software 7. The call processing software 7 then activates the application 9 to retrieve voice mail messages from audio file 11.

In response to pressing a "Find Number" key 17 while listening to a voice mail message, DTMF digits (or other signaling) are sent by the telephone 3 to the call processing software 7. A keypad access code, or soft key on telephone 3, or a GUI button or menu item on PC 5 may replace the key 17. The call processing software 7 then causes the application 9 to launch a voice recognition application (e.g. Speak@Ease by Mitel Corporation) with instructions to search for a number in the retrieved voice mail message, as described in greater detail below. When the voice recognition application finds a number, it is presented to the user at telephone 3 or PC 5 via voice or textual display (provided the phone 3 supports textual display). It is contemplated that the extracted phone number may be validated against the phone number extracted from Caller ID data that may be stored in the voice message. Upon extraction of a number, the application 9 generates a user prompt for further instructions. The user prompt can be either voice or text. In response to the prompt, the user can select from one of several feature keys (or access codes, or soft keys or GUI buttons or menu items) identified in FIG. 1 as "Accept Number" key 19, "Continue Search" key 21, or "Abandon Search" key 23.

On selecting the "Accept Number" key 19 while listening to a voice mail message, DTMF digits (or other signaling) are sent by the telephone 3 to the call processing software 7. The software 7 then causes the application 9 to accept a number extracted from a voice mail message as a result of the prior activation of the "Find Number" key 17. The extracted number (or text for e-mail, etc.) may then be used to trigger further actions, as discussed in greater detail below with reference to FIGS. 2 and 3.

In response to pressing the "Continue Search" key 21 while listening or after having listened to a voice mail message, DTMF digits (or other signaling) are sent by the telephone 3 to the call processing software 7. The software 7 then causes the application 9 to continue searching for further voiced numbers in a voice mail message after an initial voiced number or numbers have been extracted.

Upon pressing the "Abandon Search" key 23 while listening or after having listened to a voice mail message, DTMF digits (or other signaling) are sent by the telephone 3 to the call processing software 7 which, in response causes the application 9 to abandon any voiced number search underway.

In response to pressing the "Set Phrases" key 25 while listening or after having listened to a voice mail message, DTMF digits (or other signaling) are sent by the telephone 3 to the call processing software 7. The software 7 then causes the application 9 to display a graphical user interface (FIG. 4) for assignment of voiced phrases to specific pattern items (e.g., extension, local phone number, email address, etc.).

Upon pressing the "See Full List" key 27, while listening or after having listened to a voice mail message, DTMF digits (or other signaling) are sent by the telephone 3 to the call processing software 7. The software 7 then causes the application 9 to display a graphical user interface (FIG. 3) for listing all of the assigned voiced phrases and associated items.

As indicated above, the present invention utilizes a voice recognition application (e.g. Speak@Ease by Mitel Corporation) with instructions to search for a number in the retrieved voice mail message. It is well known that voice signals can be divided up into sections, cslu.cse.ogi.edu/tutordemos/nnet_recog/recog, Jul. 6, 1999, for analysis. Voice is usually stored in digital format, or can be converted from analog to digital format for storage in audio file 11. Thus, when the "Find Number" key 17 is pressed, the call processor 7 launches the voice number extraction application 9 which analyzes the voice message by dividing the message into detected speech patterns. These speech patterns are compared to data in knowledge database 12 using grammar representations (i.e. so-called "hot phrases" representing) programmed by the user, as discussed in greater detail below. The sound database 13 contains sound samples and algorithms, which are used by the application 9 to evaluate speech patterns, as discussed in greater detail below.

The grammar representations (FIG. 4) each have associated tracking pointers (i.e. pointers to symbols in a phrase) at the beginning of each sound representation. For example, in FIG. 4 the phrase #### has a tracking pointer pointing to the first '#' in the phrase, where '#' represents a number wildcard which has been specified in a user programmed grammar representation. If a number is found in the voice message (e.g. the voiced number '1'), then the tracking pointer points to the next '#' in the phrase. This means that the next sound heard in the voice mail must be a number in order for the application 9 to detect a match. The tracking pointer defaults to the beginning of the phrase, but can be positioned at a specified point in a phrase identified by a "hot symbol" such as "@" shown in FIG. 4, in which case the tracking pointer points to points adjacent the "hot symbol" on either side thereof. The drop-down actions shown in FIG. 4 contain pre-defined pattern types. For example, when a pattern of nnnn is entered, then the pattern type is defaulted to an extension. However, the user may change the default to something else.

If two or more phrases are extracted, the first phrase is displayed and if the user chooses the 'continue search' key 21, the application 9 displays the second extracted phrase.

Figure 2:
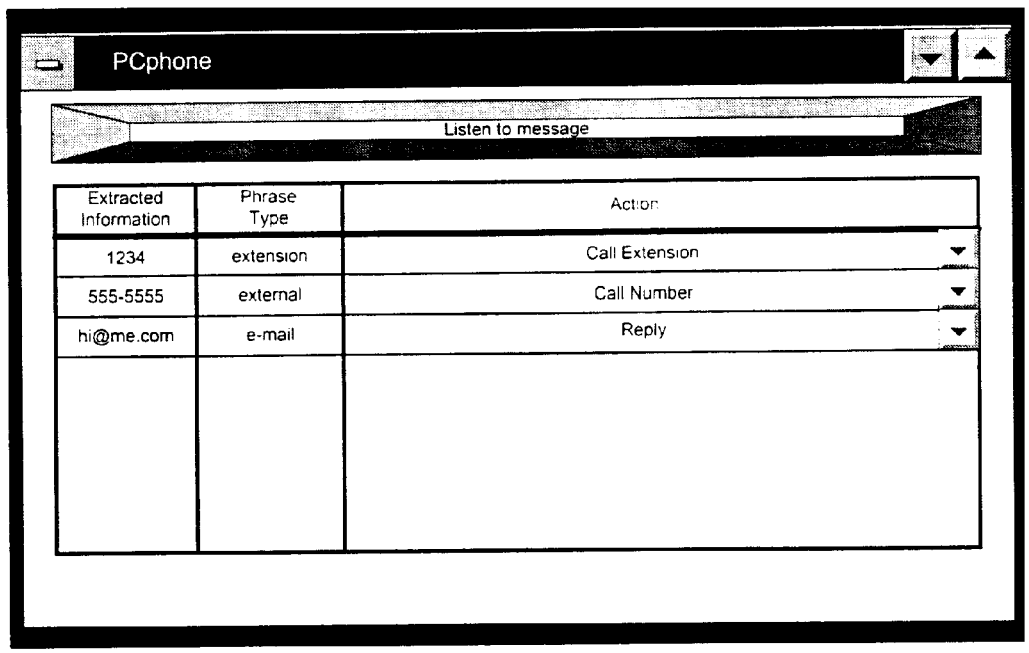
FIG. 2 is a graphical user interface showing an example of the manner in which extracted information is presented to the user according to the invention.
Figure 3:
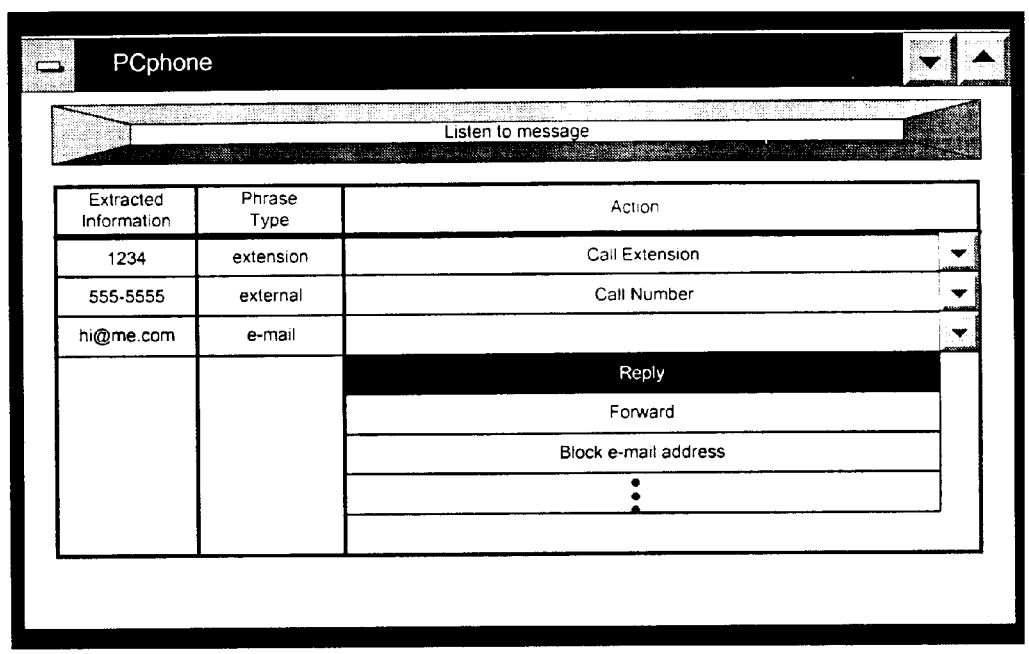
FIG. 3 is a graphical user interface showing an example of user selection of an action to be performed using the extracted information shown in FIG. 2.

As shown in FIGS. 2 and 3, extracted phrases can be selected by the user to trigger further actions in other applications and use the 'extracted' information. In that regard, the drop-down actions displayed are context sensitive. For example, the extracted phrase "external" has as valid actions: 'Call Number', 'Phone Book', etc. The extracted phrase "e-mail" has 'Reply', 'Block e-mail Address', etc. as actions. The user may add other actions.

Figure 4:
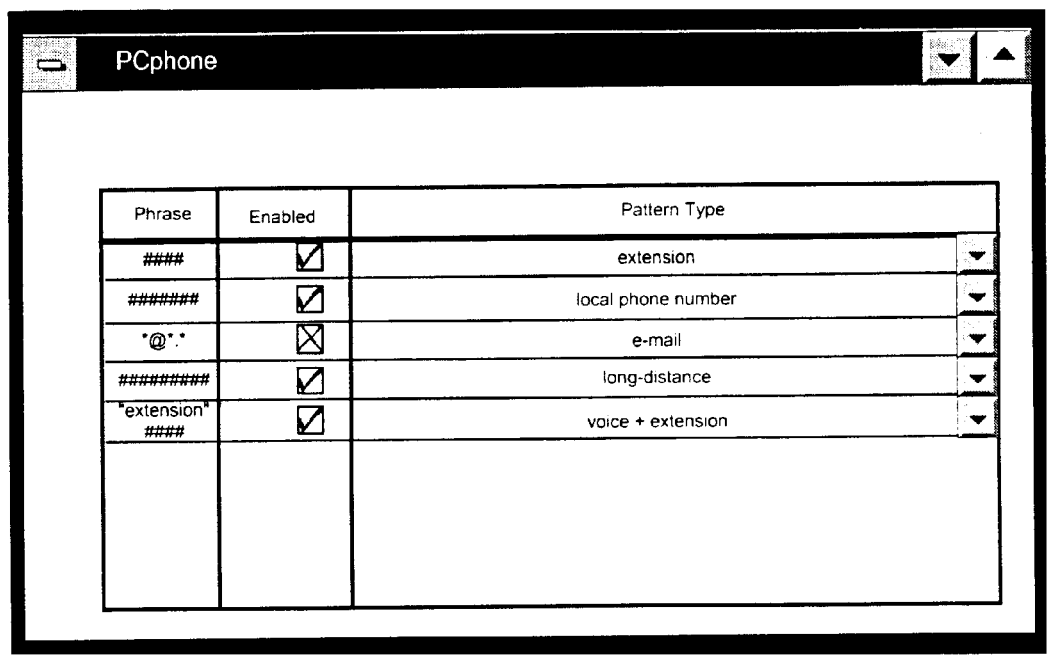
FIG. 4 is a graphical user interface showing an initialization screen for user programming of information to be extracted from voice mail messages.

In operation, the voice number extraction application 9 loads consecutive speech patterns into positions of a memory (e.g. a FIFO), up to the maximum number of symbols specified by the user in the grammar representation (FIG. 4). For each group of stored symbols, the individual stored sounds, symbols, numbers, letters or words are compared with any user identified "hot phrases", which are groupings of "hot symbols" and wildcards. The "hot symbols" within each hot phrase are compared to the counterpart symbols in the stored sound block. If all of the hot symbols match, then all of the sound blocks are analyzed to determine what the message says. The phrase is then bookmarked for listening.

For example, assume the grammars specified by the user are: phrase 1=*@.* and phrase 2=##@**.on.ca. The first phrase has eight blocks of sound required (six *'s and two symbols ('@' and '.')), whereas the second phrase has eleven blocks of sound required (two *'s, two #'s (any 2 numbers), and seven symbols ('@', two '.', 'o', 'n', 'c', and 'a')). Therefore, the maximum number of sound blocks needed is eleven blocks. Consequently, eleven sound blocks are saved sequentially as each sound block is being analyzed, as follows:

| 1 | 2 | 3 | 4 | 5 | 6 | 7 | 8 | 9 | 10 | 11 |
|---|---|---|---|---|---|---|---|---|----|----|
| Hi | Bob | how | are | you | i'm | ok | You | | | |

Phrase 1

On the eighth block of sound from the voice mail message phrase 1 stored in sound data file 13 is compared with the sound samples in the block range 1–8. Sound block 4 is compared with '@' (pronounced 'at') and sound block 7 is compared with '•' (pronounced 'dot'). Since there is no match in the illustrated example, the next sound bite is saved to block 9, as follows

| 1 | 2 | 3 | 4 | 5 | 6 | 7 | 8 | 9 | 10 | 11 |
|---|---|---|---|---|---|---|---|---|----|----|
| Hi | Bob | how | are | you | i'm | ok | You | can | | |

Phrase 1

The application 9 then compares '@' with sound block 5 and '•' with sound block 8. Again, in the illustrated example there is no match.

After several block comparisons, the stored phrase segments become as follows:

| 1 | 2 | 3 | 4 | 5 | 6 | 7 | 8 | 9 | 10 | 11 |
|---|---|---|---|---|---|---|---|---|----|----|
| Hi | Bob | how | are | you | i'm | ok | You | can | reach | me |

Phrase 2

Phrase 1

The application 9 compares '@' with sound block 7 and '.' with sound block 10. Again, in the illustrated example there is no match. At this stage, a sufficient number of sound blocks have been stored that phrase 2 may begin to be compared. In particular, phrase 2 compares:

Block 1 to see if it is a number.
Block 2 to see if it is a number.
Block 3 with '@' (pronounced 'at').
Block 6 with '•' (pronounced 'dot').
Block 7 with 'o'.
Block 8 with 'n'.
Block 9 with '.' (pronounced 'dot').
Block 10 with 'c'.
Block 10 with 'a'.

NOTE: in practice, for efficiency, the comparison with other blocks is continued only if a match is found for Block 1.

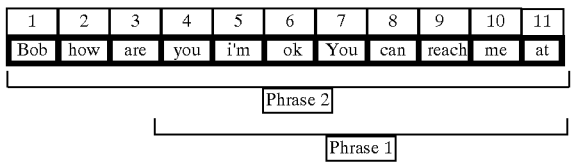

The sound block list is sequentially pushed through the FIFO (first in, first out) stack. Thus, the phrase 'Hi' disappears from the stack as the list is pushed to the left and the next sound element from the voice message is queued (i.e. the phrase 'at' in block 11).

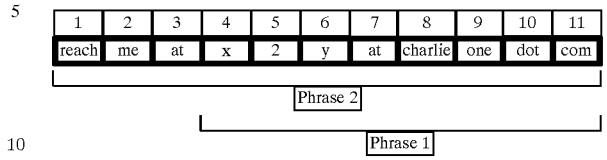

After additional comparisons and shifts, the phrases stored in the FIFO reach a position at which there is a match, as indicated above. The phase 'reach' used to be in sound block 9 but has now been queued to sound block 1.

Phrase 1 matches because:

Block 7 is an '@'. pronounced 'at')

Block 10 is a '.'. (pronounced 'dot')

For a user listening to a voice mail message, the pseudo-code for each of the call processing block 7 and voice number extraction block 9 is as follows:

---

```
Call Processing:
    CASE "Find Number feature key pressed":
        Launch Voice Number Extraction Application.
    CASE "Voice Number Extraction Application accepted number"
        Process accepted number.
    CASE "Voice Number Extraction Application abandoned search"
        Do nothing.
Voice Number Extraction Application:
    CASE "Accept Number feature key pressed":
        Inform Call Processing of accepted number.
    CASE "Continue Search feature key pressed":
Voice Number Extraction Application proceeds to look for other numbers
        CASE "Abandon search feature key pressed":
            Inform Call Processing that search has been abandoned.
        CASE "Set Phrases"
            Bring up menu (FIG. 4)
        CASE "See Full List"
            Bring up menu (FIG. 3)
        CASE "Listen to Message"
If not doing a search, play entire message.
Else plays message around the current position in the Voice Mail search (3–5 seconds before
and after symbol).
Call Processing:
Case:  Find Number
Use Voice Number Extraction to extract the Number/E-mail
If voice number extraction application 9 finds a number:
    Allow user to listen to message (activate Listen to Message button)
    Wait for user to select button
    If user selects Accept button
        Either do pre-selected action (FIG. 2), or allow user to make selection box
        (FIG. 3), or read number over phone.
    Else if Abandon Search button pressed
        Exit Search
    Else if See Full List button pressed
        Bring up FIG. 2 or read message over phone.
    Else if Listen to Message button pressed
        Play edited message.
    Else
        Continue
    Endif
Endif
Voice Number Extraction Application:
All Tracking Pointers (TP) initialized
Set aside number of blocks of data needed for 'Hot Phrases'
Take voice message and compare it with Sound database algorithms relative to the symbols
pointed to by the tracking pointers.
```

-continued

```
If symbol, number, letter, or word found
    Do until grammars list completed
        Compare number, letter, or word found with tracking pointer to the current grammar.
            If Tracking Pointer satisfied
                If grammar satisfied
                    Display grammar string (FIG. 1) and provide information to
                    call processing
                    Wait for user to select button
                    If user selects Accept button
                        Either do pre-selected action (FIG. 2), or allow user to
                        make selection box (FIG. 3), or read number over
                        phone.
                    Else if Abandon Search button pressed
                        Exit Search
                    Else if See Full List button pressed
                        Bring up FIG. 2 or read numbers over phone.
                    Else
                        Continue
                    Endif
                Else
                    Increment tracking pointer of grammar
                Endif
            Else
                Go to next grammar
        Endif
    End Do
    If no phrase satisfied
        Disable accept, continue, and abandon buttons.
        Enable Find Number button.
    Endif
```

It will be appreciated that, although embodiments of the invention have been described and illustrated in detail, various changes and modifications may be made. All such changes and modifications may be made without departing from the sphere and scope of the invention as defined by the claims appended herein.

What is claimed is:

1. A system for extracting information from a voicemail message, comprising:
   a knowledge database for storing sound and noise algorithms representing symbols, numbers, letters, and words arranged according to user programmed grammar representations representing phrases to be identified in said voicemail message; and
   a voiced number extraction application for dividing said voicemail message into detected speech patterns, comparing said speech patterns to said sound and noise algorithms using said grammar representations and extracting and presenting matching ones of said symbols, numbers, letters, and words corresponding to said phrases to be identified in said voicemail message;
   wherein each of said phrases comprises at least one hot symbol matching one of said speech patterns in order to identify one of said phrases.

2. The system of claim 1, further including a user interface for launching said application, accepting said phrases identified in said voicemail message and initiating predetermined contextual actions based thereon, and for terminating said application.

3. The system of claim 2, wherein said user interface selectively displays multiple ones of said contextual actions for associated ones of said phrases.

4. The system of claim 1, further including a user interface for entering said grammar representations representing phrases to be identified in said voicemail message.

5. The system of claim 1, wherein each of said phrases further comprises a wildcard representing any symbol which is not required to match one of said speech patterns in order to identify said one of said phrases.

6. The system of claim 5, wherein said wildcard is a number wildcard representing any number which is not required to match one of said speech patterns in order to identify said one of said phrases.

7. A method of extracting information from a voicemail message, comprising:
   storing sound and noise algorithms representing symbols, numbers, letters, and words arranged according to user programmed grammar representations representing phrases to be identified in said voicemail message, wherein each of said phrases comprises at least one hot symbol;
   dividing said voicemail message into detected speech patterns;
   comparing said speech patterns to said sound and noise algorithms using said grammar representations and extracting and presenting matching ones of said symbols, numbers, letters, and words corresponding to said phrases to be identified in said voicemail message, wherein said at least one hot symbol matches one of said speech patterns in order to identify one of said phrases.

8. The method of claim 7, further comprising initiating predetermined contextual actions based on said phrases identified in said voicemail message.

9. The method of claim 8, further comprising selectively displaying multiple ones of said contextual actions for associated ones of said phrases.

10. The method of claim 9, wherein said comparing further comprises:
   i) storing a predetermined number of said detected speech patterns in respective FIFO memories, wherein said predetermined number is equal to the number of symbols, numbers, letters, and words in the longest of said phrases to be identified;
   ii) initializing a plurality of tracking pointers to respective ones of said symbols, numbers, letters, and words in respective ones of said phrases to be identified;

iii) comparing successive ones of said symbols, numbers, letters, and words identified by said tracking pointers to said speech patterns stored in said FIFO memories;

iv) until each of said symbols, numbers, letters, and words has been compared, increment said tracking pointers and repeat step iii);

v) until each detected speech pattern has been compared, shift said detected speech patterns through said FIFO memories and repeat steps ii) through iv); and vi) in the event of a match display said match.

* * * * *